(12) United States Patent
Liu et al.

(10) Patent No.: US 12,002,294 B2
(45) Date of Patent: Jun. 4, 2024

(54) RGB-NIR DUAL CAMERA FACE ANTI-SPOOFING METHOD

(71) Applicant: Black Sesame International Holding Limited, Santa Clara, CA (US)

(72) Inventors: Xiaomin Liu, Sunnyvale, CA (US); Lei Zhang, Campbell, CA (US); Qun Gu, San Jose, CA (US); Zilong Hu, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 295 days.

(21) Appl. No.: 17/192,605

(22) Filed: Mar. 4, 2021

(65) Prior Publication Data

US 2022/0284229 A1    Sep. 8, 2022

(51) Int. Cl.
G06V 40/40 (2022.01)
G06V 40/16 (2022.01)
H04N 5/33 (2023.01)
H04N 23/45 (2023.01)

(52) U.S. Cl.
CPC ............ *G06V 40/40* (2022.01); *G06V 40/168* (2022.01); *H04N 5/33* (2013.01); *H04N 23/45* (2023.01)

(58) Field of Classification Search
CPC ...... G06V 40/40; G06V 40/168; H04N 23/45; H04N 5/33
USPC ........................................................ 382/118
See application file for complete search history.

(56) References Cited

U.S. PATENT DOCUMENTS

| | | | |
|---|---|---|---|
| 10,609,360 B2 | 3/2020 | Chang et al. | |
| 10,726,245 B2 | 7/2020 | Wen | |
| 2014/0153823 A1 | 6/2014 | Lee et al. | |
| 2018/0220894 A1* | 8/2018 | Tsumatori | A61B 5/0044 |
| 2018/0330488 A1* | 11/2018 | Ouzounis | G06T 7/0002 |
| 2019/0037128 A1 | 1/2019 | Wang et al. | |
| 2022/0067519 A1* | 3/2022 | Mishra | G06V 40/16 |

FOREIGN PATENT DOCUMENTS

| | | |
|---|---|---|
| CN | 108040243 A | 5/2018 |
| CN | 108694715 A | 10/2018 |
| CN | 111080568 A | 4/2020 |
| CN | 111695406 A | 9/2020 |
| CN | 111814545 A | 10/2020 |
| CN | 112104847 A | 12/2020 |
| CN | 109614996 A | 5/2022 |

OTHER PUBLICATIONS

Hanqiu Xu, Remote Sensing Information Extraction of Urban Built-up Land Based on a Data-, dimension Compression Technique, Journal of Image and Graphics, Feb. 2005, vol. 10, No. 2.
Qingfei Liu, Hongli Zhang, Yanling Wang, Real-Time Pixel-Wise Classification of Agricultural Images Based on Depth-Wise Separable Convolution, Scientia Agricultura Sinica, 2018,51(19):3673-3682.

* cited by examiner

*Primary Examiner* — Michael R Neff (74) *Attorney, Agent, or Firm* — Timothy T. Wang; Ni, Wang & Massand, PLLC (57) ABSTRACT

A method of face anti-spoofing, comprising, receiving a near infra-red facial image, having a near infrared channel, receiving a red-green-blue facial image, having a red channel, a green channel and a blue channel, generating a synthetic three channel image based on the near infrared channel, the red channel, the green channel and the blue channel and training a deep neural network based on the synthetic three channel image.

9 Claims, 12 Drawing Sheets

RGB-NIR DUAL CAMERA FACE ANTI-SPOOFING METHOD

BACKGROUND

Technical Field

The instant disclosure is related to a dual camera (i.e., a red-blue-green camera and a near infrared camera) face anti-spoofing method.

Background

Current facial anti-spoof methods extract texture features from images to train a classifier so as to distinguish live faces from spoof faces. For examples, local binary pattern (LBP) and image distortion analysis (IDA) are capable of training and testing images that are taken under similar imaging conditions. However, the LBP/IDA method may be sensitive to camera and lighting differences and may have poor generalization ability.

Other anti-spoofing methods rely on depth information from a 3D camera, or utilize the user's cooperation to perform predefined facial actions. The 3D camera relies upon time of flight data and may induce an additional expense and utilization of pre-defined facial actions may be unfriendly to the end users and take additional time.

SUMMARY

An example method of face anti-spoofing, comprising, receiving a near infra-red facial image, having a near infra-red channel, receiving a red-green-blue facial image, having a red channel, a green channel and a blue channel, generating a synthetic three channel image based on the near infrared channel, the red channel, the green channel and the blue channel and training a deep neural network based on the synthetic three channel image.

Another example method of face anti-spoofing, comprising, receiving a near infra-red facial image, having a near infrared channel, receiving a red-green-blue facial image, having a red channel, a green channel and a blue channel and fusing a feature map of the near infrared channel and the red channel, the green channel and the blue channel to form a fused layer, wherein the feature map is fused at a convolutional layer at an intermediate level of a deep neural network.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope of the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
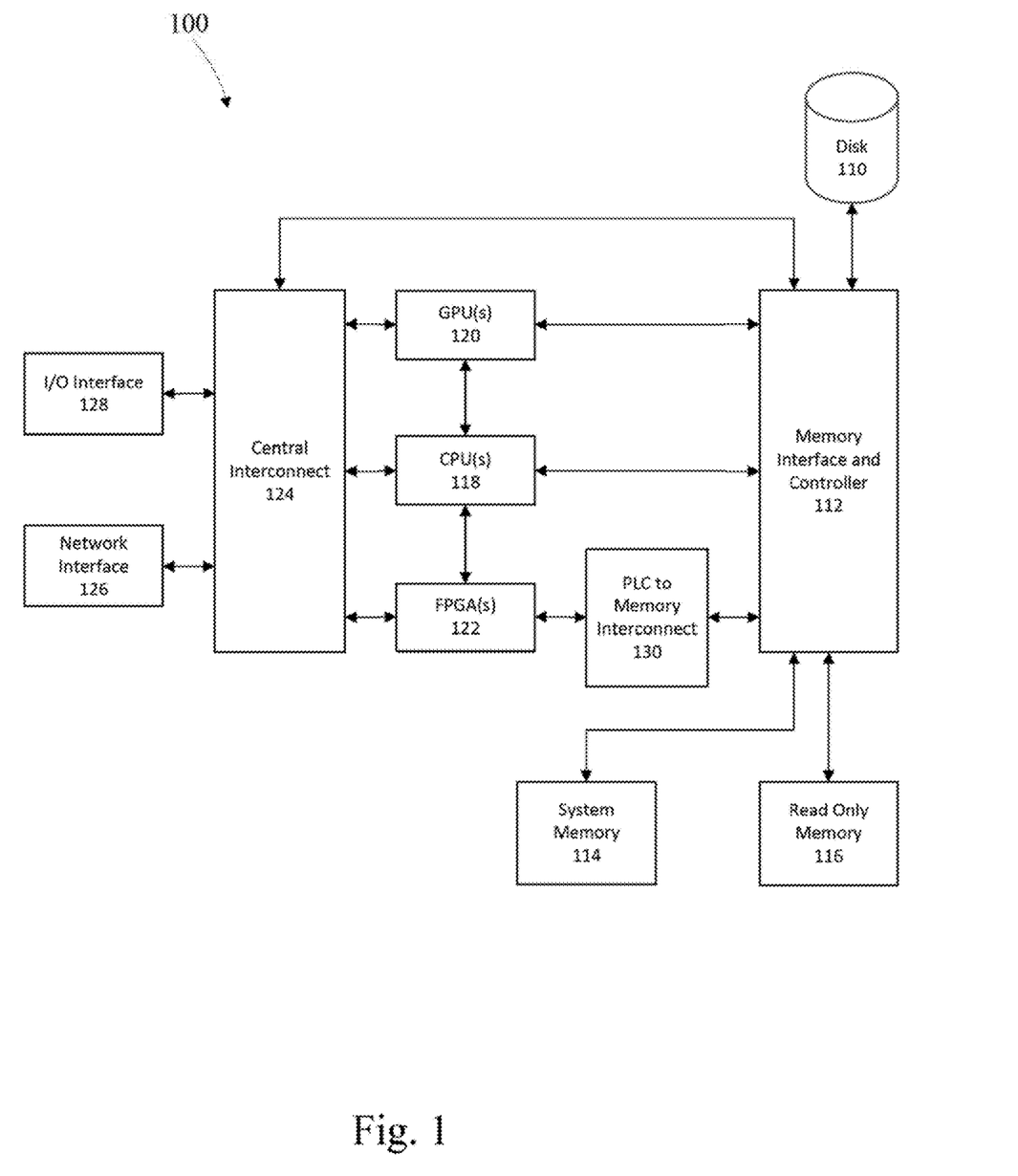
FIG. 1 is a first example system diagram in accordance with one embodiment of the disclosure.

FIG. 1 depicts an example hybrid computational system 100 that may be used to implement neural nets associated with the operation of one or more portions or steps of process 1100. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

The system of FIG. 1 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller are connected to a central interconnect 124, the central interconnect is additionally connected to the GPU 120, CPU 118 and FPGA 122. The central interconnect 124 is additionally connected to the input and output interface 128 and the network interface 126.

Figure 2:
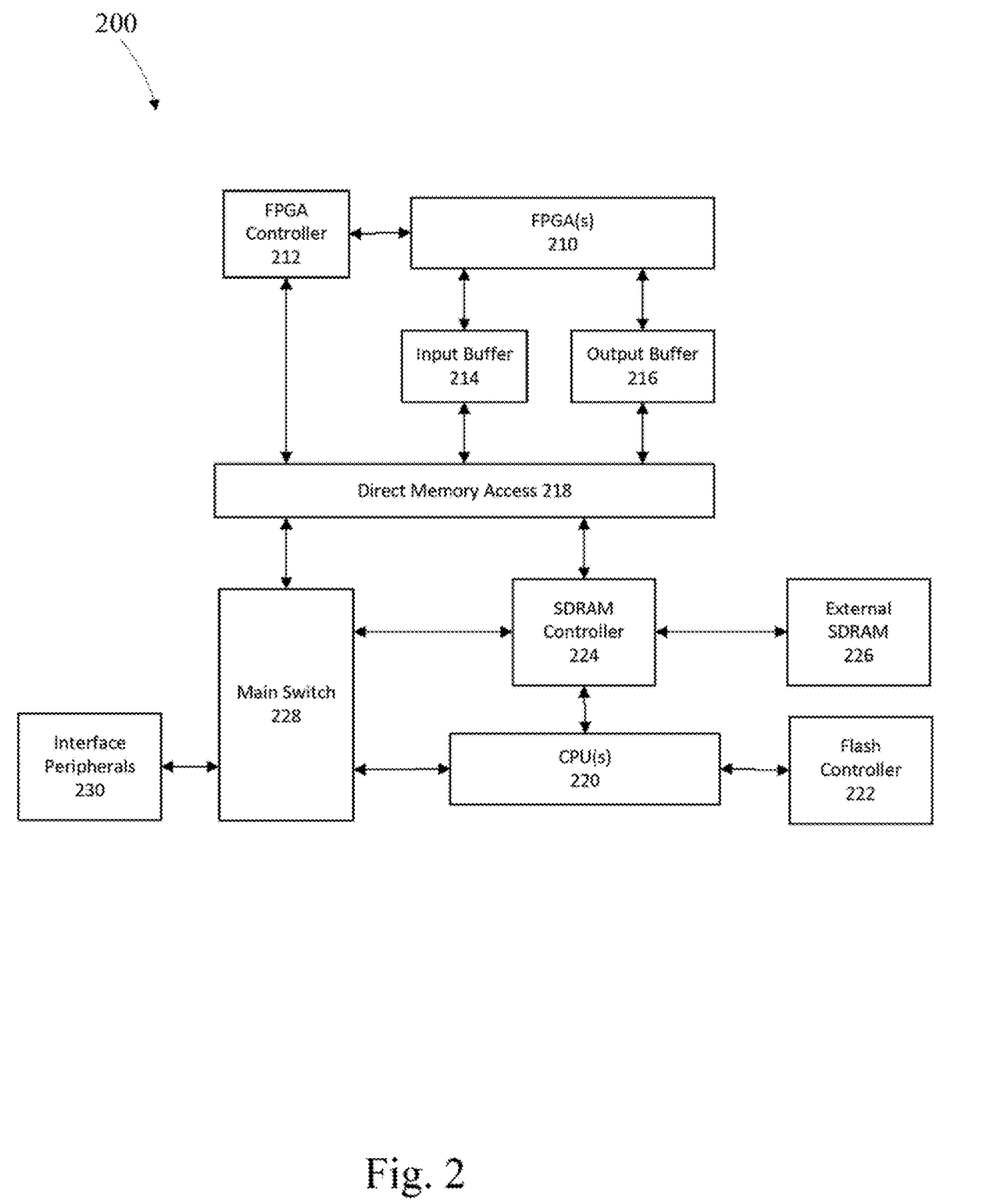
FIG. 2 is a second example system diagram in accordance with one embodiment of the disclosure.

FIG. 2 depicts a second example hybrid computational system 200 that may be used to implement neural nets associated with the operation of one or more portions or steps of process 1200. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers, one for the host CPU and the other for the FPGA. The DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Current systems utilizing facial recognition for secure access may be breached by spoof attacks such as face photo prints and video replays. Facial anti-spoofing technology is becoming an important part of facial authentication systems. Anti-spoofing methods allow a system to detect and reject spoof attacks which enhances system security. Current anti-spoofing techniques rely upon either three dimensional (3D) depth information from time-of-flight analysis or recognition of pre-defined actions such as smiling, nodding, eye blinking and the like. Current face anti-spoofing systems may exhibit low accuracy and poor generalization ability.

Two embodiments are described that combine information from near infrared (NIR) and red-blue-green (RGB) image sources to train a deep neural network. The first embodiment utilizes a dual modality input from an NIR and RGB dual camera set to capture NIR and RGB images of a human face and generate a synthetic three-channel image. The second embodiment provides a two-branch network structure for processing an NIR input and an RGB input of the human face.

The NIR-RGB models demonstrate high accuracy and the ability to distinguish genuine live faces from spoof attacks. The embodiments have been compared to a current local binary pattern (LBP)-support vector machines (SVM) method and a current infrared (IR) single-modality method.

The first embodiment utilizes a near infrared (NIR) camera and a red-blue-green (RGB) camera to achieve facial anti-spoofing based on combined mixed channel inputs routed through a deep neural network. The NIR camera input may provide a lighting condition invariant image, while the RGB camera may provide facial color information. The first embodiment yielded test results having an enhanced accuracy [true positive rate (TPR)>99.9% at false acceptance rate (FAR)=10e-3.5] based on a dataset of 300 live subjects and 1000 spoof subjects.

An NIR camera consists of an NIR light source, NIR transmissive lens and NIR responsive sensor. It detects light having an NIR wavelength spectrum of 700 nm to 1400 nm, and typically filters utilizing a narrow NIR band-pass filter. Electronic versions of spoof attacks such as photos or videos displayed on cellphone, tablet or computer screens are rejected by the NIR camera since they are not within NIR wavelength spectrum. The NIR image may capture 3D structural details. The appearance of NIR images resembles a grayscale image since colored light is not within the NIR wavelength spectrum. The image quality is typically invariant with respect to environmental light variations. However, NIR images lack visible color information and the reflection details from natural light.

An RGB camera receives data in the visible light wavelength spectrum and processes color images that are close to what human vision perceives. An RGB camera outputs contain rich color information and the reflection of natural environmental light on 3D objects.

In one example, the NIR camera and the RGB camera are set at a fixed distance from one another on a horizontal line. The NIR and RGB video frames are captured synchronously and passed to the image processing system.

Figure 3:
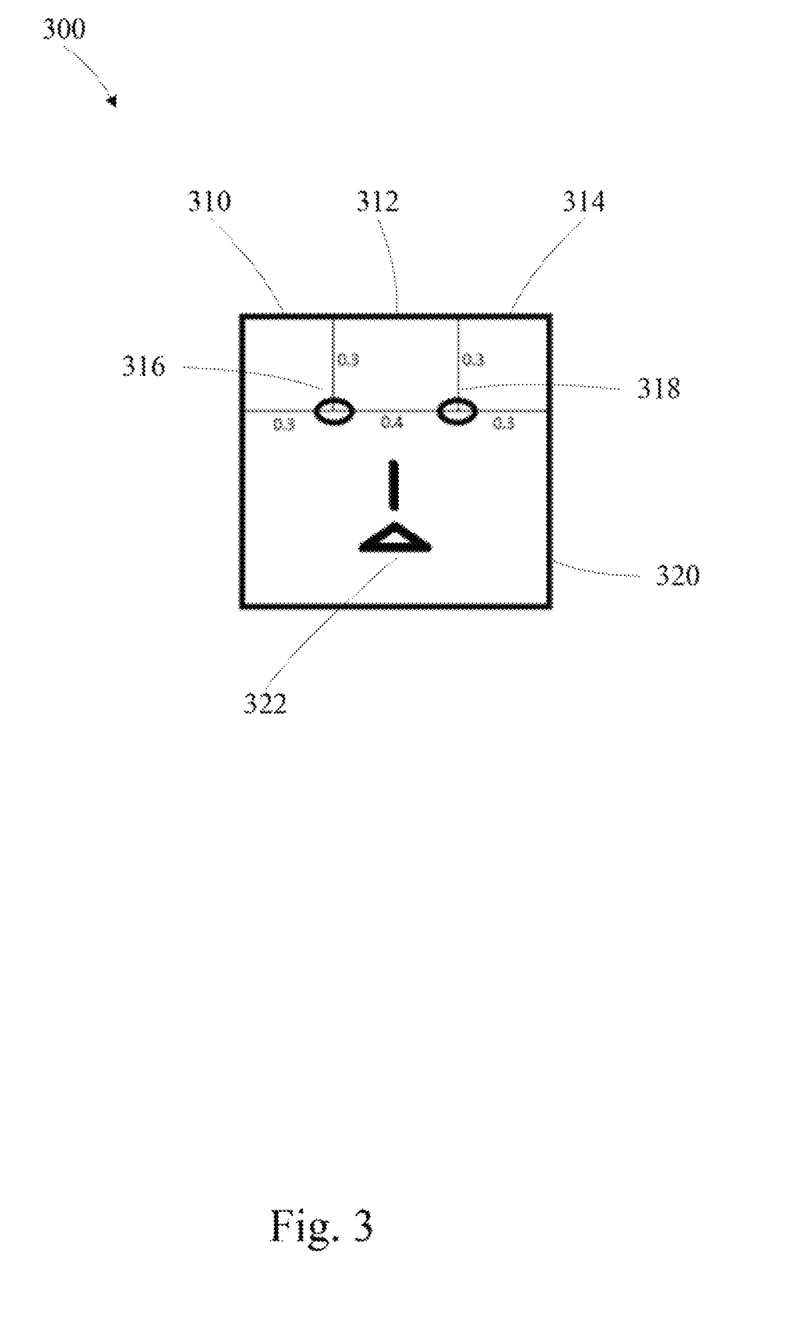
FIG. 3 is an example facial region of interest in accordance with one embodiment of the disclosure.

A facial detector may identify faces in NIR and RGB images and return their bounding box positions as shown in FIG. 3, 300. The bounding boxes 310, 312, 314 320 in the pair of NIR and RGB images are matched according to their positions, sizes and shapes to determine whether they belong to the same human face. After a face is detected in the NIR and RGB images, the facial landmarks 316, 318 322 may be extracted including the center positions of both eyes. The facial regions of interest (ROI) may be cropped from the pair of NIR and RGB images and aligned according to the two eye centers.

A synthetic three channel image may be recast from the NIR and RGB facial regions of interest. One example of this method utilizes mobilenet v1 as a baseline classification model. Due to the limited image data collected from the NIR-RGB dual camera, the model weights are pre-trained on ImageNet to initialize the training. Pre-training on a large scale dataset may provide low level filters weights that capture image details for high level classification. Training from scratch with small dataset may result in under-training, lack of generalization capability and low performance of the model. To reuse the pre-trained weights, the input utilizes a three channel (RGB) image. In one example embodiment the single channel NIR and three channel RGB images are combined to generate a synthetic 3-channel image.

Figure 4:
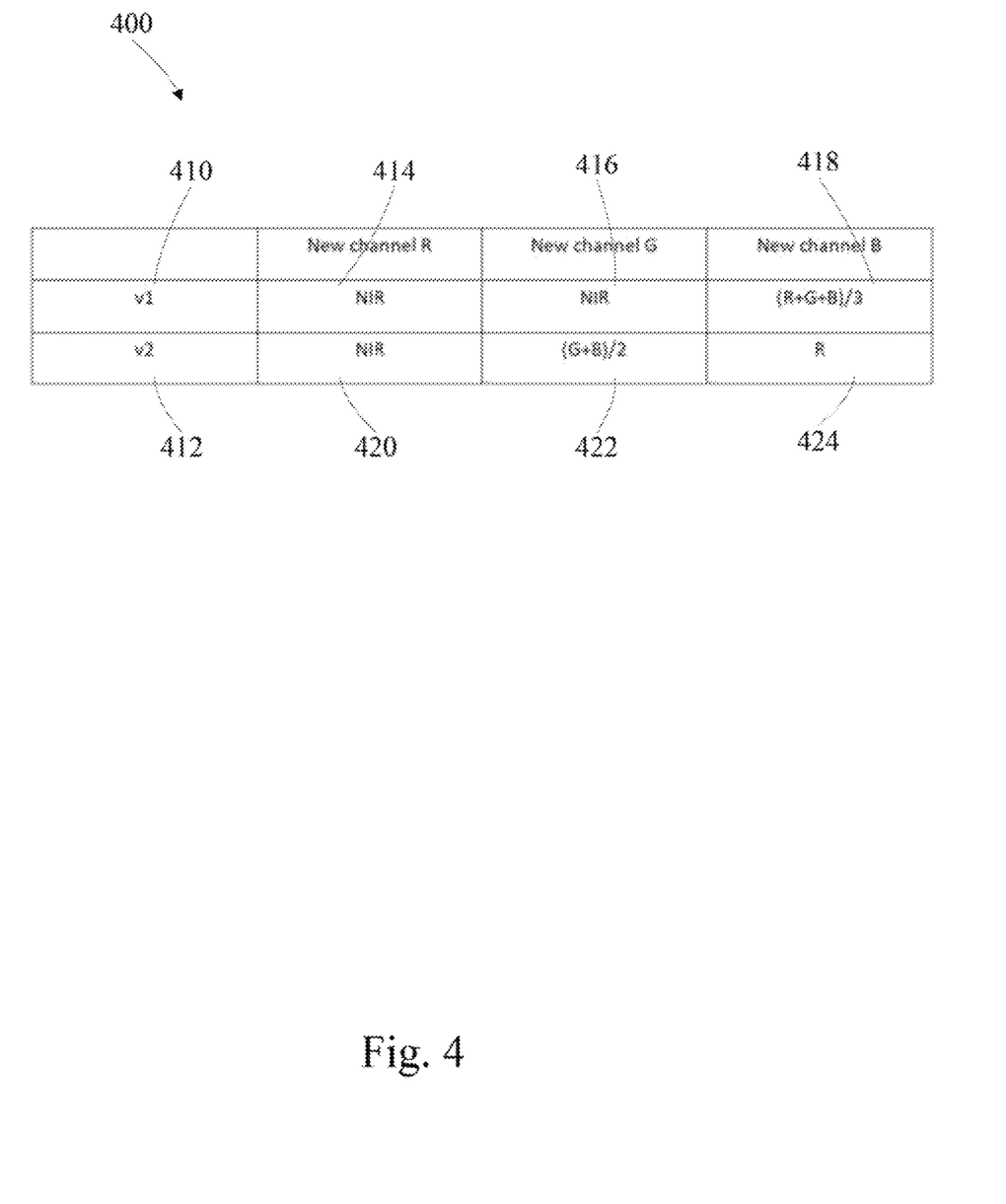
FIG. 4 is an example NIR-RGB synthetic three channel image modeling in accordance with one embodiment of the disclosure.

The first two variants of the first embodiment convert the pair of NIR-RGB images to a new synthetic 3-channel image utilizing a linear combination of NIR channel and R, G, B channels. The formulas of two versions (v1, 410 and v2, 412) are shown in FIG. 4 were trained and tested. Variant 1 (v1, 410) inputs the NIR image 414 on a new R channel and the NIR image 416 on a new G channel and linearly combines the RGB image 418 onto the new B channel. Variant 2 (v2, 412) inputs the NIR image 420 onto the new R channel, linearly mixes the blue and green channels 422 onto the new G channel and inputs the red channel 424 on the new R channel.

A third variant of the first embodiment generates a synthetic 3-channel image from the NIR-RGB image pairs by converting the RGB image to a YUV format, replacing Y channel with NIR image, and utilizing a linear combination of Y and NIR as the new Y channel. The method then converts the new YUV channels to a synthetic RGB 3-channel image.

A fourth variant of the first embodiment generates a synthetic 3-channels image from the NIR-RGB image pairs by converting the RGB image to YUV format and decomposing the Y channel and NIR single channel images in frequency domain. The method combines the high frequency decomposed images of Y and NIR into a high frequency set, combines the low frequency decomposed images of Y and NIR into a low frequency set and reconstructs a new synthetic RGB 3-channel image from frequency images the high frequency set and the low frequency set.

Figure 5:
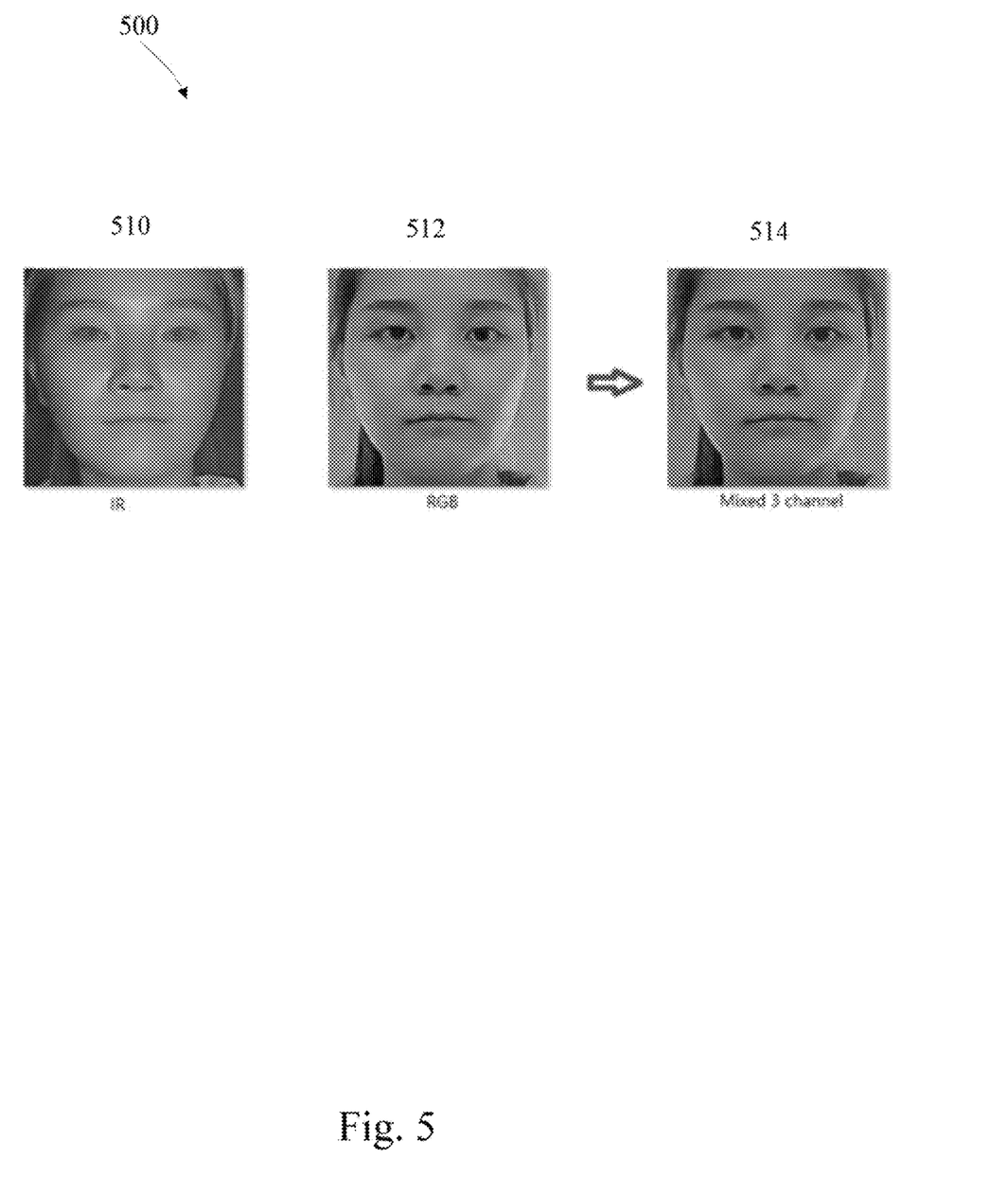
FIG. 5 is an example NIR-RGB three channel synthetic image in accordance with one embodiment of the disclosure.

FIG. 5, 500 depicts combining an RGB image 512 and an NIR image 510 to allow access to the advantages of RGB and NIR images. RGB images contain color information for distinguishing faces from black and white photo prints. NIR images may be captured under a constant point light source, which enhances structural details under various environmental lighting conditions. The result is a synthesis of the NIR-RGB channels 514.

Figure 6:
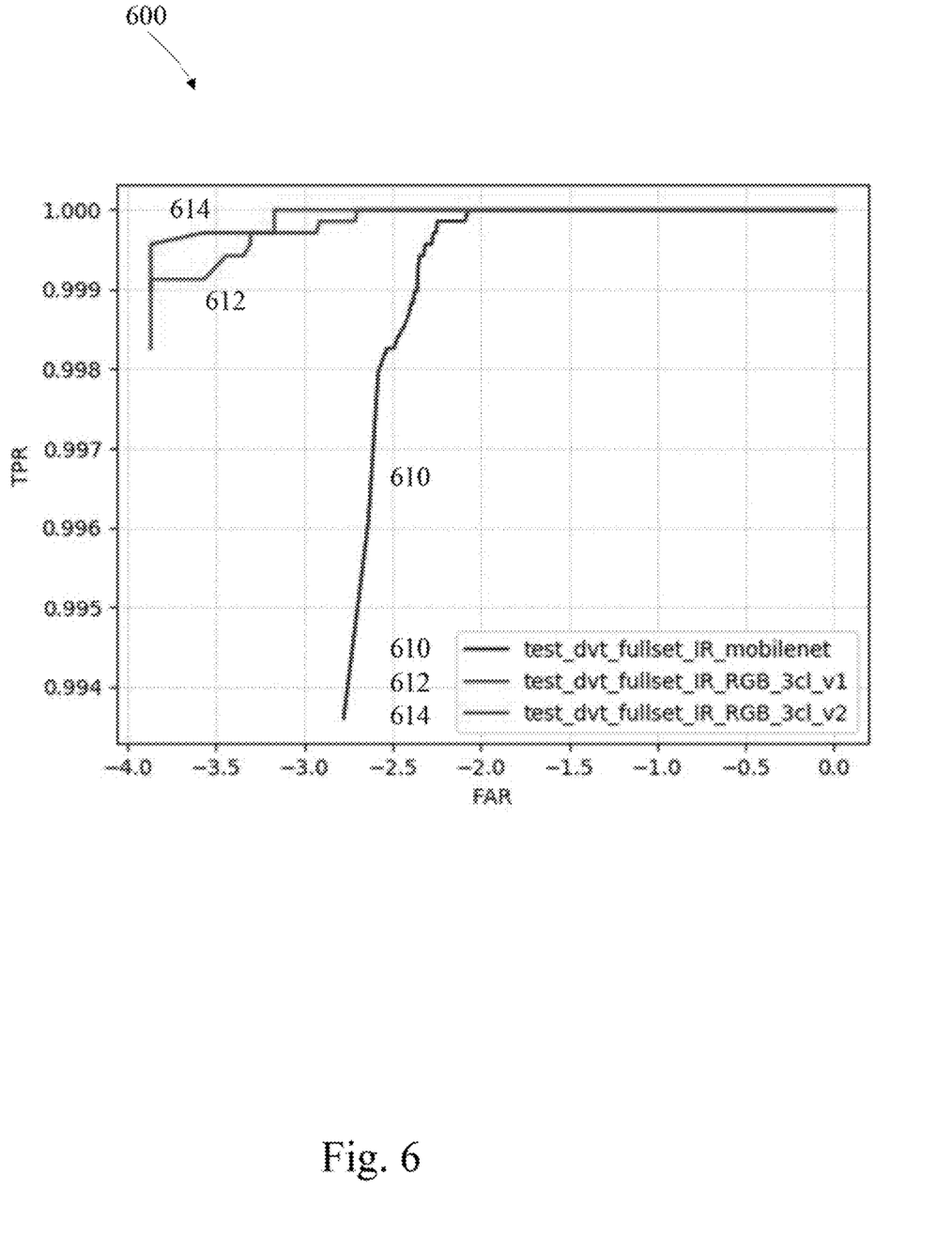
FIG. 6 is an example NIR-RGB three channel synthetic mixing model's receiver operating characteristic (ROC) curve in accordance with one embodiment of the disclosure.

In FIG. 6, the true positive rate (TPR) and the false acceptance rate (FAR) are plotted for the output for the following models, NIR image 610, an NIR-RGB image utilizing v1, 610 from FIG. 4 and an NIR-RGB image utilizing v2, 614 from FIG. 4. The anti-spoof models were trained on synthetic 3-channel images generated by v1, 612 and v2, 614 methods with the same model trained on NIR images 610. As demonstrated in the FIG. 6 the v1, 612 and the v2, 614 methods outperformed a current method utilizing NIR images only as input 610.

FIG. 6 indicates that the v2, 614 method outperformed the v1, 612 method, which may have resulted due to the v2 method incorporating additional color information from RGB images into the model. The v1 method has two channels from NIR image and one channel from RGB image, with R, G, B channels are averaged out. The v2 method utilizes one channel of NIR and two channels derived from RGB images.

Based on the approach of training on NIR-RGB 3-channel synthetic images, the observation is made that combining NIR and RGB images may be beneficial for facial anti-spoofing performance. Generating an NIR-RGB 3-channel synthetic image is based in part on accurate alignment of the NIR and RGB images, which is based on facial landmark detection. The facial landmark detection includes inaccuracies and may produce errors due to large pose and facial occlusion such as eyeglasses, hair and the like. Landmark detection errors may cause misalignment between the NIR and RGB face regions of interest, resulting in an unrealistic synthetic image such as a double-image depicted in FIG. 7, 700, resulting in structural and color information offsets.

Figure 8:
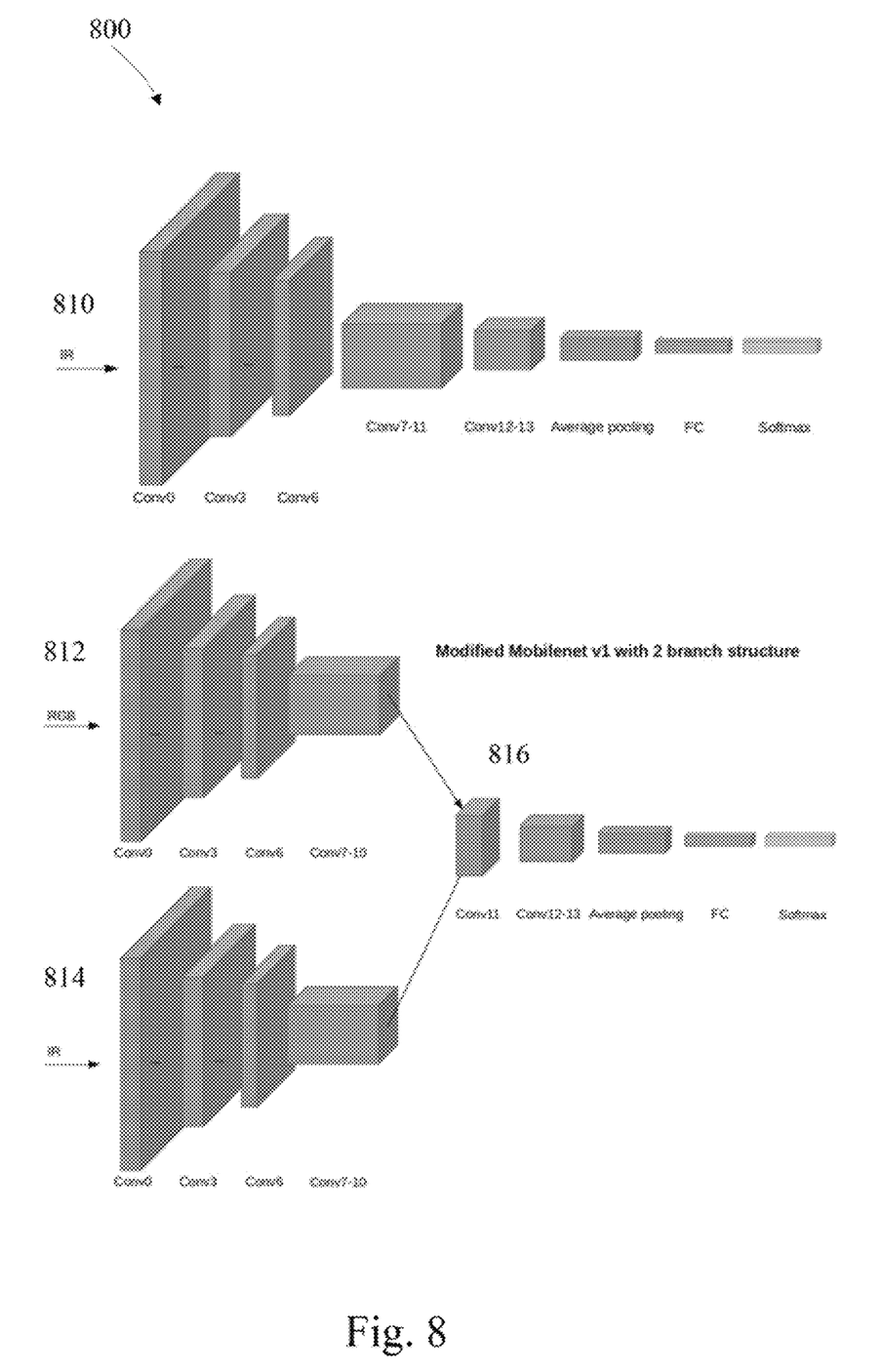
FIG. 8 is an example mobilenet flow in accordance with one embodiment of the disclosure.

FIG. 8 depicts the routing of NIR and RGB images through the deep neural network, which may be accomplished in at least two ways. The synthetic 3-channel image of the first embodiment may be routed through the neural net as shown in 810. The second routing of NIR and RGB images through the neural net may be to input the RGB image through a first initial portion of net 812 and input the NIR image through a second initial portion of net 814. At a point downstream the first initial portion of net 812 and the second initial portion of net 814 are concatenated and are routed through the remainder of the neural net as one combined stream. This second routing of the NIR and RGB images through the neural net involves facial landmark detection and facial alignment utilizing a two branch mobilenet-v1 structure that inputs NIR and RGB channels in parallel runs in two separate branches of convolutional layers (depth-wise and point-wise).

Figure 7:
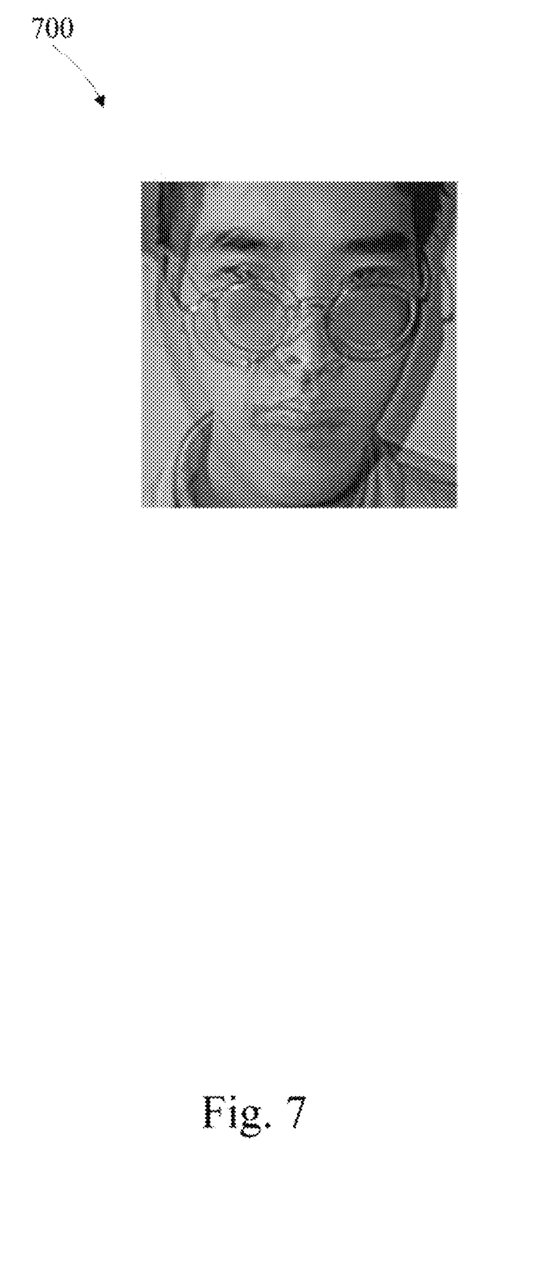
FIG. 7 is an example NIR-RGB misalignment.

The two branches are concatenated at a merging layer 816 and then run through the remainder of the network. The structures of the original mobilenet v1 model and the 2 branch mobilenet v1 model are demonstrated in FIG. 8. Since the two feature maps are merged after several convolutional layers, the misalignment between NIR and RGB face regions of interest as seen in FIG. 7, 700 has little influence on the fusion of the two signals.

In the two branch model, the number of input channels doubles at the merging layer 816 (conv11) due to the concatenation. The number of output channels at the merging layer (conv11) is the same as the original network. Therefore, the rest of the network structure remains the same.

At least two factors have an effect on the selection of the merging layer. Due to the limited training data size, a set of pre-trained network weights is utilized to initialize the training. The pre-trained weights are loaded on both branches up to the merging layer. However, since the structure of merging layer changes due to the concatenation, the pre-trained weights are not used after the merging layer.

If the two branches are merged too early, only the pre-trained weights on the first few layers may be applied. The rest of the network may need to be trained from scratch based on limited data. If the two branches are merged too late, the model acts as if it is training two separate networks and combining them at the end, which may lose the low level and spatial correlation between NIR and RGB images. In one example, based on initial experimental results, merging at layer conv11 (FIG. 9, 920) yielded the best results.

Figure 9:
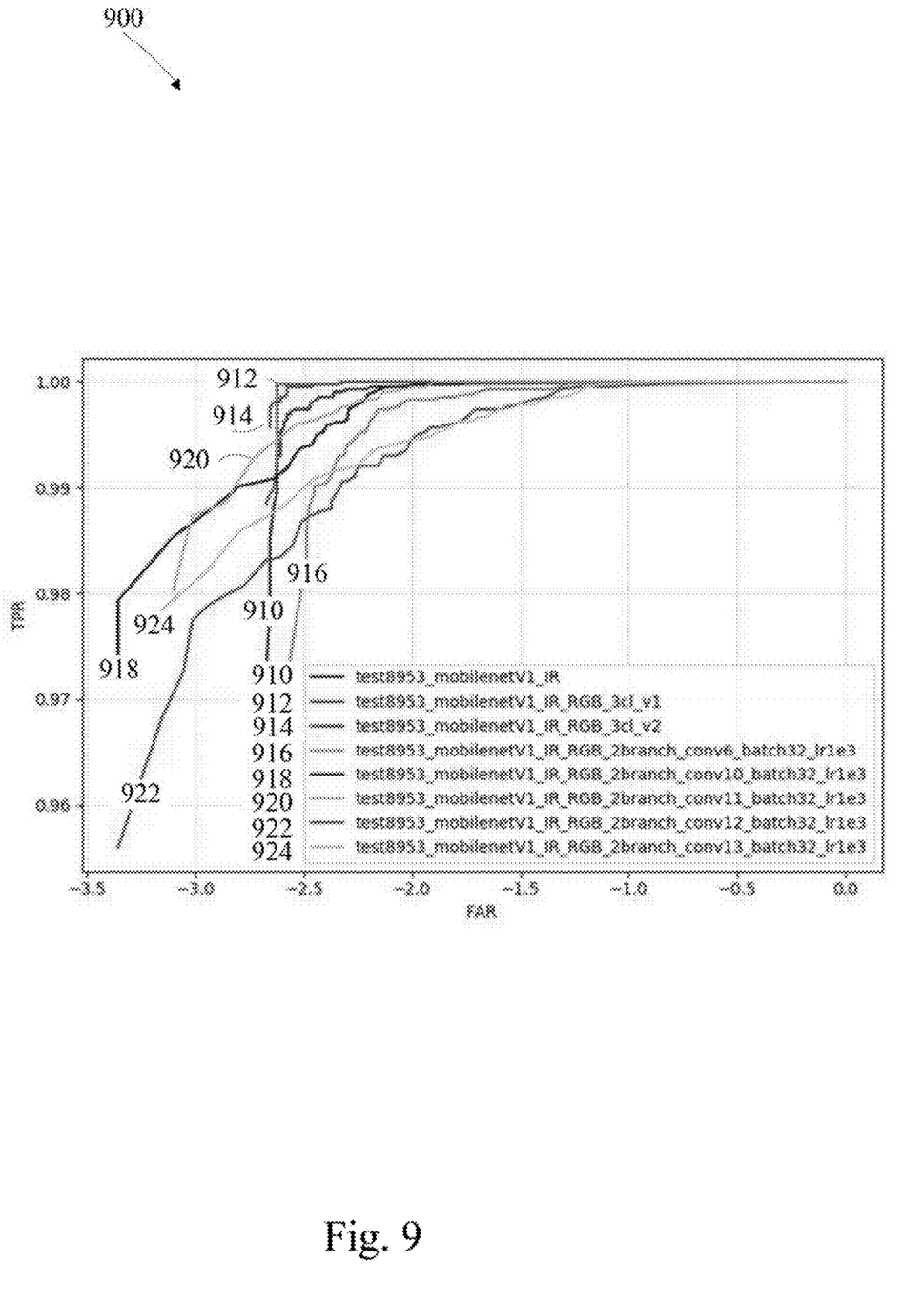
FIG. 9 is an example mobilenet flow model's receiver operating characteristic (ROC) curve and comparisons in accordance with one embodiment of the disclosure.

FIG. 9 depicts the output of the true positive rate (TPR) versus false acceptance rate (FAR) for the following mobilenet based models, NIR-only 910, synthetic three channel NIR-RGB v1, 912, synthetic three channel NIR-RGB v2, 914, two branch NIR-RGB concatenated at layer 6, 916, two branch NIR-RGB concatenated at layer 10, 918, two branch NIR-RGB concatenated at layer 11, 920, two branch NIR-RGB concatenated at layer 12, 922 and two branch NIR-RGB concatenated at layer 13, 924.

The 2 branch models (916-924) and the NIR-RGB synthetic 3 channel models (912-914) outperformed the NIR-only 910 baseline model. The NIR-RGB 3 channel v2 model (FIG. 9, 914) achieved the best performance among the models tested, due to having a mixture of NIR and RGB color information, and the ability to fully utilize the ImageNet pre-trained model.

Figure 10:
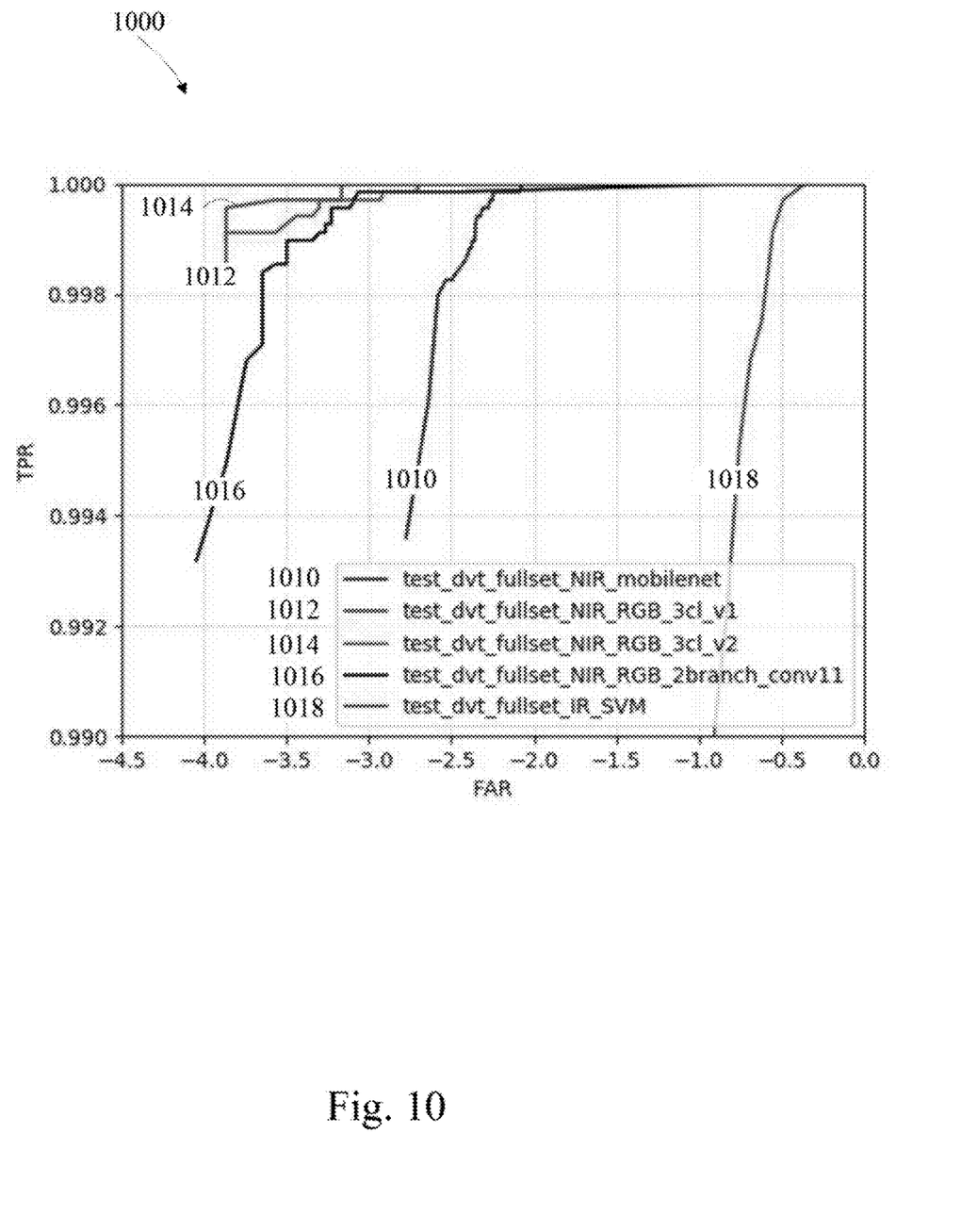
FIG. 10 is another example mobilenet flow model's receiver operating characteristic (ROC) curve and comparisons in accordance with one embodiment of the disclosure.

FIG. 10 depicts the output of true positive rate (TPR) versus false acceptance rate (FAR) for the following models, NIR only 1010, synthetic three channel NIR-RGB v1, 1012, synthetic three channel NIR-RGB v2, 1014, two branch NIR-RGB concatenated at layer 11, 1016, and the current NIR local binary pattern (LBP) support vector machines (SVM) method 1018.

The NIR-RGB 2 branch model concatenated at convolutional layer 11 (FIG. 10, 1016) provides slightly lower performance than the NIR-RGB 3 channel synthetic v2 model (FIG. 10, 1014). One possible reason may be that the pre-trained weight may not be fully reused. The NIR-RGB models significantly outperformed a traditional computer vision solution based on LBP-SVM algorithm (FIG. 10, 1018).

Figure 11:
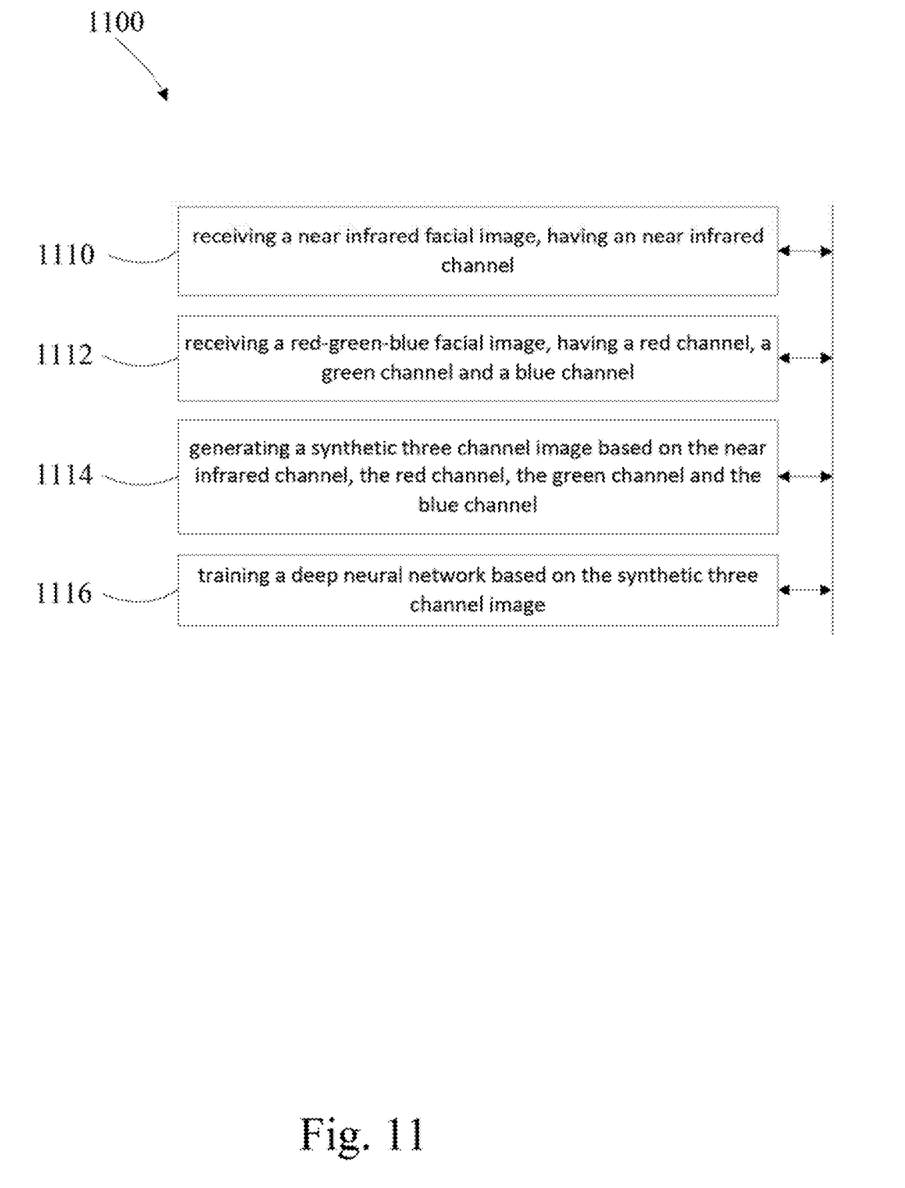
FIG. 11 is an example method in accordance with one embodiment of the disclosure.

FIG. 11 depicts an example method of face anti-spoofing, comprising, receiving 1110 a near infrared facial image, having a near infrared channel and receiving 1112 a red-green-blue facial image, having a red channel, a green channel and a blue channel. The method further generates 1114 a synthetic three channel image based on the near infrared channel, the red channel, the green channel and the blue channel and trains 1116 a deep neural network based on the synthetic three channel image.

In this example method, the first new channel may include the near infrared channel, a second new channel may include the near infrared channel and a third new channel may include an average of the red channel, the green channel and the blue channel.

The first new channel may include the near infrared channel, a second new channel may include an average of the green channel and the blue channel and a third new channel may include the red channel.

The method may also include converting the red-green-blue facial image to a luma-blue-red facial image having a luma channel, a blue channel and a red channel, replacing a new luma channel with the near infrared channel and converting the luma-blue-red facial image to a new synthetic red-green-blue facial image.

The method may additionally include converting the red-green-blue facial image to a luma-blue-red facial image having a luma channel, a blue channel and a red channel, replacing a new luma channel with an average of the near infrared channel and the luma channel and converting the luma-blue-red facial image to a new synthetic red-green-blue facial image.

The method may also include converting the red-green-blue facial image to a luma-blue-red facial image having a luma channel, a blue channel and a red channel, decomposing the luma channel in a frequency domain, decomposing the near infrared channel in the frequency domain and combining the high frequency components of the decomposed luma channel and near infrared channel. The method may additionally include combining the low frequency components of the decomposed luma channel and near infrared channel and reconstructing a new synthetic image from the combined high frequency component and low frequency component.

Figure 12:
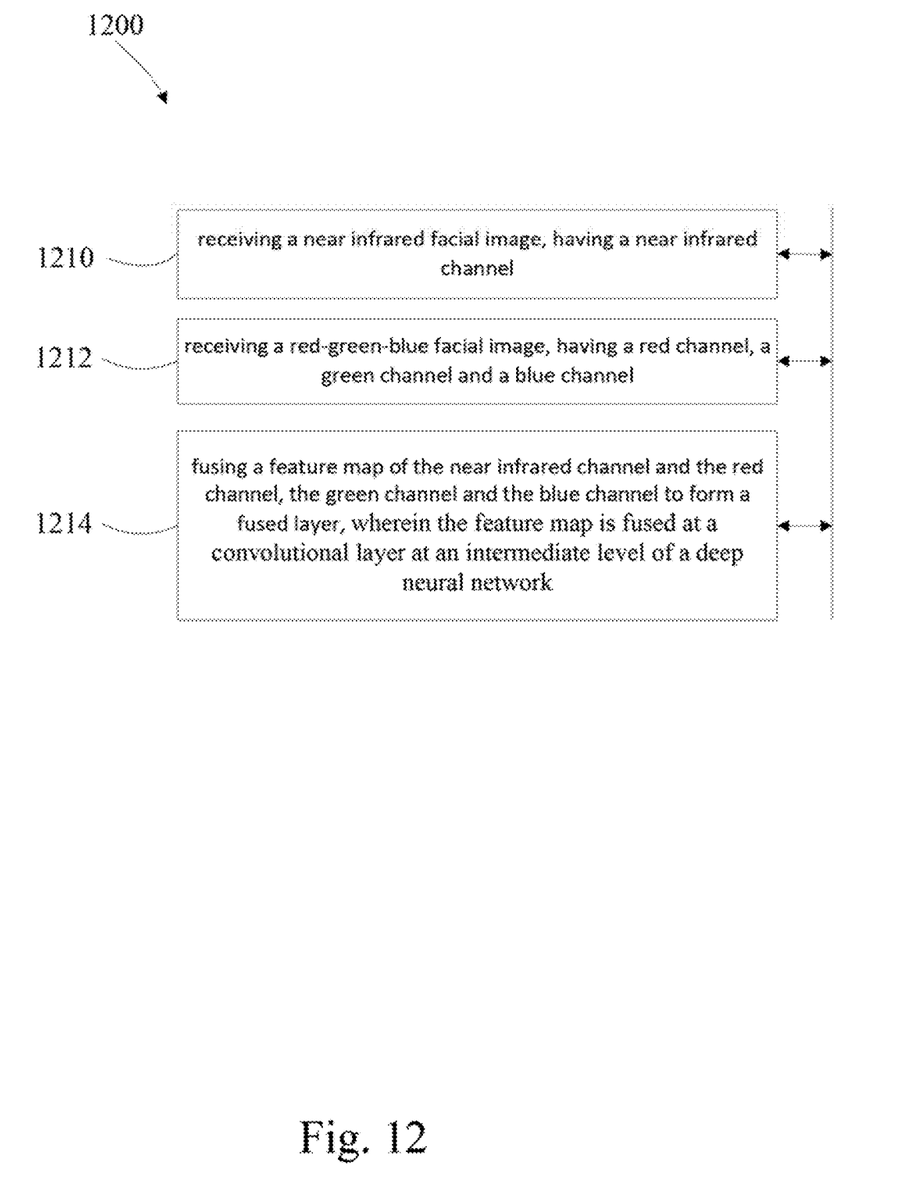
FIG. 12 is another example method in accordance with one embodiment of the disclosure.

FIG. 12 depicts another example method of face anti-spoofing, comprising, receiving 1210 a near infrared facial image, having a near infrared channel and receiving 1212 a red-green-blue facial image, having a red channel, a green channel and a blue channel. The method also includes fusing 1214 a feature map of the near infrared channel and the red channel, the green channel and the blue channel to form a fused layer, wherein the feature map is fused at a convolutional layer at an intermediate level of a deep neural network.

In this example, the fusing may be performed at convolutional layer 11 and the convolutional layer fusing may be performed on a depth-wise and point-wise basis. The number of input channels doubles for the fused layer and the number of output channels of the fused layer remains the same.

Solution examples described in the instant application provide deep learning based face anti-spoofing system with NIR-RGB dual modality input. One embodiment combines NIR and RGB dual input face regions of interest images to generate a synthetic 3 channel image for training a deep neural network. Another embodiment utilizes a 2-branch neural network structure that takes NIR and RGB dual input face regions of interest images and fuses the feature maps at intermediate layer to capture low level and spatial correlation. The NIR-RGB models were tested on a large dataset (300 live subjects and 1000 spoof subjects) and demonstrated high performance after training with ImageNet pre-trained weights.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of facial recognition, comprising:
    receiving a near infrared facial image, having a near infrared channel;
    receiving a red-green-blue facial image, having a red channel, a green channel and a blue channel;
    generating a synthetic three channel image, based on the near infrared channel, the red channel, the green channel and the blue channel, having a first new channel, a second new channel, and a third new channel; and
    processing a deep neural network based on the synthetic three channel image wherein the near infrared facial image and the red-green-blue facial image are fed into the deep neural network.

2. The method of facial recognition of claim 1, wherein the first new channel comprises the near infrared channel, the second new channel comprises the near infrared channel and the third new channel comprises an average of the red channel, the green channel and the blue channel.

3. The method of facial recognition of claim 1, wherein the first new channel comprises the near infrared channel, the second new channel comprises an average of the green channel and the blue channel and the third new channel comprises the red channel.

4. The method of facial recognition of claim 1, further comprising:
    converting the red-green-blue facial image to a luma-blue-red facial image having a luma channel, the blue channel and the red channel;
    replacing the luma channel with the near infrared channel; and
    converting the luma-blue-red facial image to a second red-green-blue facial image.

5. The method of facial recognition of claim 1, further comprising:
    converting the red-green-blue facial image to a luma-blue-red image having a luma channel, the blue channel and the red channel;
    replacing the luma channel with an average of the near infrared channel and the luma channel; and
    converting the luma-blue-red facial image to a second red-green-blue facial image.

6. The method of facial recognition of claim 1, further comprising:
    converting the red-green-blue facial image to a luma-blue-red facial image having a luma channel, the blue channel and the red channel;
    decomposing the luma channel in a frequency domain;
    decomposing the near infrared channel in the frequency domain;
    combining high frequency components of the decomposed luma channel and high frequency components of the decomposed near infrared channel;
    combining low frequency components of the decomposed luma channel and low frequency components of the decomposed near infrared channel; and
    reconstructing a new synthetic image from the combined high frequency components and the combined low frequency components.

7. The method of facial recognition of claim 1, wherein processing the deep neural network based on the synthetic three channel image wherein the near infrared facial image and the red-green-blue facial image are fed into the deep neural network comprises
    fusing at an intermediate layer a first feature map based on the near infrared channel and a second feature map based on the red channel, the green channel and the blue channel to form a fused feature map,
    wherein the fused feature map is fused at a convolutional layer at an intermediate level of the deep neural network.

8. The method of facial recognition of claim 7, wherein the convolutional layer fusing is performed on a depth-wise and point-wise basis.

9. The method of facial recognition of claim 7, wherein the first feature map and the second feature map are processed in parallel.

* * * * *